United States Patent
Tsukishima et al.

(10) Patent No.: US 10,233,313 B2
(45) Date of Patent: Mar. 19, 2019

(54) RUBBER COMPOSITION AND PNEUMATIC TIRE USING THE SAME

(71) Applicant: The Yokohama Rubber Co., LTD., Minato-ku, Tokyo (JP)

(72) Inventors: Shin Tsukishima, Hiratsuka (JP); Miyuki Oka, Hiratsuka (JP); Makoto Ashiura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 75 days.

(21) Appl. No.: 15/502,445

(22) PCT Filed: Jul. 17, 2015

(86) PCT No.: PCT/JP2015/070572
§ 371 (c)(1),
(2) Date: Feb. 7, 2017

(87) PCT Pub. No.: WO2016/021394
PCT Pub. Date: Feb. 11, 2016

(65) Prior Publication Data
US 2017/0233559 A1 Aug. 17, 2017

(30) Foreign Application Priority Data

Aug. 7, 2014 (JP) ................................ 2014-160949
Mar. 10, 2015 (JP) ................................ 2015-047159

(51) Int. Cl.
| C08L 9/06 | (2006.01) |
| B60C 1/00 | (2006.01) |
| C08K 3/36 | (2006.01) |
| C08K 5/103 | (2006.01) |
| C08K 5/54 | (2006.01) |
| C08L 45/00 | (2006.01) |
| C08K 5/548 | (2006.01) |

(52) U.S. Cl.
CPC .................... *C08L 9/06* (2013.01);
*B60C 1/00* (2013.01); *B60C 1/0016* (2013.01);
*C08K 3/36* (2013.01); *C08K 5/103* (2013.01);
*C08K 5/54* (2013.01); *C08K 5/548* (2013.01);
*C08L 45/00* (2013.01)

(58) Field of Classification Search
CPC ........... C08L 9/06; B60C 1/0016; C08K 3/36; C08K 5/548; C08K 5/103
USPC ....................................................... 524/262
See application file for complete search history.

(56) References Cited

U.S. PATENT DOCUMENTS

| 5,717,022 A * | 2/1998 | Beckmann | B60C 1/0016 |
| | | | 152/450 |
| 9,309,387 B2 | 4/2016 | Kushida et al. | |
| 9,765,202 B2 * | 9/2017 | Yonennoto | B60C 1/00 |
| 9,868,794 B2 * | 1/2018 | Iizuka | B60C 1/00 |
| 2013/0172443 A1 | 7/2013 | Kushida et al. | |
| 2013/0338255 A1 | 12/2013 | Naka et al. | |
| 2015/0133600 A1 * | 5/2015 | Iizuka | B60C 1/00 |
| | | | 524/573 |
| 2015/0315358 A1 * | 11/2015 | Yonemoto | B60C 1/00 |
| | | | 524/313 |
| 2016/0108210 A1 | 4/2016 | Sato et al. | |

FOREIGN PATENT DOCUMENTS

| JP | H08-302077 | | 11/1996 |
| JP | 09309978 | A * | 12/1997 |
| JP | H09-309978 | | 12/1997 |
| JP | 2006-052407 | | 2/2006 |
| JP | 2011-052090 | | 3/2011 |
| JP | 2011052090 | A * | 3/2011 |
| JP | 2013-133401 | | 7/2013 |
| JP | 2013133401 | A * | 7/2013 |
| JP | 2014-047295 | | 3/2014 |
| WO | WO 2012/035998 | | 3/2012 |
| WO | WO 2012/073841 | | 6/2012 |
| WO | WO 2014/050341 | | 4/2014 |
| WO | WO 2014/098155 | | 6/2014 |
| WO | WO 2014/185495 | | 11/2014 |

OTHER PUBLICATIONS

International Search Report for International Application No. PCT/JP2015/070572 dated Aug. 25, 2015, 4 pages, Japan.

* cited by examiner

*Primary Examiner* — Michael Bernshteyn
(74) *Attorney, Agent, or Firm* — Thorpe North & Western

(57) ABSTRACT

The present technology provides a rubber composition including:
(A) 100 parts by mass of a diene rubber;
(B) from 5 to 200 parts by mass of silica;
(C) from 1 to 20 mass % of a silane coupling agent relative to the silica; and
(D) from 1 to 20 mass % of a glycerin mono-fatty acid ester relative to a mass of the silica (B), the glycerin mono-fatty acid ester being derived from a fatty acid having from 8 to 24 carbons;
not less than 10 parts by mass out of 100 parts by mass of the diene rubber (A) having a hetero atom-containing functional group in a main chain and/or a terminal thereof.

8 Claims, No Drawings

RUBBER COMPOSITION AND PNEUMATIC TIRE USING THE SAME

TECHNICAL FIELD

The present technology relates to a rubber composition and a pneumatic tire including such a rubber composition. More particularly, the present technology relates to a rubber composition having excellent silica dispersibility and processability without any reduction in hardness, and a pneumatic tire including such a rubber composition.

BACKGROUND ART

Methods of compounding silica into tires have become well known in recent years in response to increasingly stringent demands for higher tire performance. However, silica has a tendency to aggregate due to the formation of hydrogen bonds caused by silanol groups present on the particle surface thereof, and is typically difficult to increase the dispersibility thereof.

Therefore, a technique of introducing a functional group which interacts with silica into the polymer constituting the matrix of a rubber composition has been proposed. However, such a polymer exhibits strong silica/polymer interactions and polymer/polymer interactions, which is problematic in that the viscosity of the unvulcanized rubber becomes high, thereby diminishing processability.

Therefore, the viscosity can be reduced by increasing the compounded amount of a softening agent such as a process oil. However, in this case, there are problems in that the hardness decreases so that the steering stability is lost, while the tan δ (60° C.) is diminished, which makes it impossible to achieve the desired low fuel consumption.

There have also been attempts to increase silica dispersibility by using a surfactant as a dispersant. For example, a technique of using diethylene glycol is disclosed in Japanese Unexamined Patent Application Publication No. H8-302077A, and a technique of using a fatty acid and trimethylolpropane is disclosed in Japanese Unexamined Patent Application Publication No. 2006-52407A. However, in each of the conventional technologies, sufficient silica dispersibility has not been achieved, and it has not been possible to simultaneously enhance hardness and low fuel consumption without diminishing processability and hardness.

SUMMARY

The present technology provides a rubber composition which enhances silica dispersibility and has excellent low fuel consumption without diminishing processability and hardness, and a pneumatic tire including such a rubber composition.

As a result of conducting dedicated research, the present inventors discovered the present technology. Specifically, the present technology is as follows.

1. A rubber composition including:
   (A) 100 parts by mass of a diene rubber:
   (B) from 5 to 200 parts by mass of silica;
   (C) from 1 to 20 mass % of a silane coupling agent relative to the silica; and
   (D) from 1 to 20 mass % of a glycerin mono-fatty acid ester relative to a mass of the silica (B), the glycerin mono-fatty acid ester being derived from a fatty acid having from 8 to 24 carbons; not less than 10 parts by mass out of 100 parts by mass of the diene rubber (A) having a hetero atom-containing functional group in a main chain and/or a terminal thereof.

2. The rubber composition according to 1 further including at least one type of copolymers (1) to (3) and a hydrogenated product (4), wherein:
   the copolymer (1) is an α-pinene-aromatic vinyl copolymer;
   the copolymer (2) is a (β-pinene-aromatic vinyl copolymer;
   the copolymer (3) is a copolymer of an aromatic vinyl and at least two types selected from the group consisting of α-pinene, (β-pinene, and dipentene; and
   the hydrogenated product (4) is a hydrogenated product of the copolymers (1) to (3).

3. The rubber composition according to 1 or 2, wherein the diene rubber having a hetero atom-containing functional group in a main chain and/or a terminal thereof is a conjugated diene rubber (A') obtained by reacting a polyorganosiloxane represented by General Formula (I') with a conjugated diene polymer chain having an active terminal obtained by forming a polymer block (C) on a polymer block (B) in succession with the polymer block (B), wherein;
   the polymer block (B) is a polymer block with a weight average molecular weight of from 500 to 15,000 having an active terminal containing from 80 to 95 mass % of an isoprene monomer unit and from 5 to 20 mass % of an aromatic vinyl monomer unit; and
   the polymer block (C) is a polymer block having an active terminal containing 1,3-butadiene and/or an aromatic vinyl monomer.

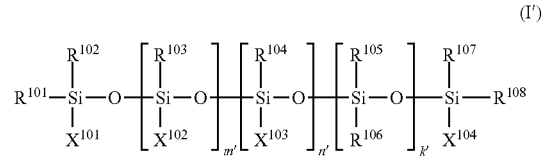

(I')

In General Formula (I') above, $R^{101}$ to $R^{108}$ are the same or different alkyl groups having from 1 to 6 carbons or aryl groups having from 6 to 12 carbons. $X^{101}$ and $X^{104}$ are the same or different groups selected from the group consisting of alkyl groups having from 1 to 6 carbons, aryl groups having from 6 to 12 carbons, alkoxy groups having from 1 to 5 carbons, and epoxy group-containing groups having from 4 to 12 carbons. $X^{102}$ is an alkoxy group having from 1 to 5 carbons or an epoxy group-containing group having from 4 to 12 carbons, and a plurality of $X^{102}$ moieties may be the same as or different from one another. $X^{103}$ is a group containing from 2 to 20 repeating alkylene glycol units, and when there are a plurality of $X^{103}$ moieties, they may be the same as or different from one another. m' is an integer from 3 to 200,
n' is an integer from 0 to 200, and
k' is an integer from 0 to 200.

4. The rubber composition according to any one of 1 to 3, wherein from 1 to 10 mass % of a compound represented by General Formula (1) is further compounded with the silica.

(1)

In General Formula (1), $R^{100}$ is an alkyl group having from 1 to 20 carbons, and Et is an ethyl group.

5. The rubber composition according to any one of 1 to 4, wherein the glycerin mono-fatty acid ester (D) contains an unsaturated bond.

6. A pneumatic tire including a tread including the rubber composition according to any one of 1 to 5.

The present technology is a rubber composition obtained by compounding specific amounts of (B) silica, (C) a silane coupling agent, and a specific (D) glycerin mono-fatty acid ester with (A) a diene rubber having a specific composition. Therefore, it is possible to provide a rubber composition which enhances silica dispersibility and has excellent low fuel consumption without diminishing processability and hardness, and a pneumatic tire including such a rubber composition.

DETAILED DESCRIPTION

The present technology will be described in further detail hereinafter.

(A) Diene Rubber

Any diene rubber that can be compounded in rubber compositions may be used as the diene rubber (A) used in the present technology. Examples thereof include a natural rubber (NR), isoprene rubber (IR), butadiene rubber (BR), styrene-butadiene copolymer rubber (SBR), and acrylonitrile-butadiene copolymer rubber (NBR). These may be used alone, or two or more types may be used in combination.

Note that in the present technology, it is necessary for not less than 10 parts by mass out of 100 parts by mass of the diene rubber (A) to have a hetero atom-containing functional group in a main chain and/or a terminal in order to enhance the silica dispersibility (called a "modified rubber" hereafter).

Such a modified rubber has polarity due to the hetero atom-containing functional group and interacts with silica so as to enhance the dispersibility, which makes it possible to obtain a rubber composition having excellent dispersibility or low heat build-up.

Examples of the modified rubber used in the present technology and the production method thereof are disclosed in the pamphlet of WO/2012/073841 or Japanese Patent No. 5240410 and are publicly known. A specific example is a modified rubber having, in an active conjugated diene polymer chain obtained by copolymerizing a conjugated diene monomer and an aromatic vinyl monomer using an organic active metal compound as an initiator in a hydrocarbon solvent, a terminal-modified group obtained by reacting at least one type of a compound having a functional group that is reactable with the active terminal of the polymer chain, wherein the terminal-modified group contains a functional group which interacts with the silica; and the modified conjugated diene polymer rubber has an aromatic vinyl unit content of from 38 to 48 wt. % a vinyl unit content of from 20 to 35%, and a weight average molecular weight of from 600,000 to 1,000,000.

Examples of the compound having the functional group that is reactable with the active terminal of the active conjugated diene polymer chain include tin compounds, silicon compounds, silane compounds, amido compounds and/or imide compounds, isocyanate and/or isothiocyanate compounds, ketone compounds, ester compounds, vinyl compounds, oxirane compounds, thiirane compounds, oxetane compounds, polysulfide compounds, polysiloxane compounds, polyorganosiloxane compounds, polyether compounds, polyene compounds, halogen compounds, and compounds having fullerenes. Among these, polyorganosiloxane compounds are preferable. One of these compounds or combinations of a plurality of these compounds can be attached to the polymer.

An example of a polyorganosiloxane compound is at least one type of a polyorganosiloxane compound selected from General Formulae (I) to (III).

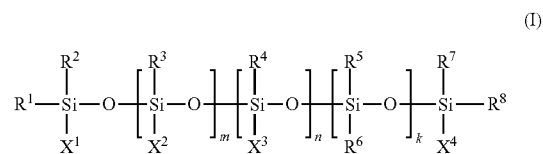

In Formula (I) above, $R^1$ to $R^8$ are the same or different alkyl groups having from 1 to 6 carbons or aryl groups having from 6 to 12 carbons. $X^1$ and $X^4$ are groups having a functional group that reacts with the terminal of a conjugated diene polymer chain, alkyl groups having from 1 to 6 carbons, or aryl groups having from 6 to 12 carbons, and $X^1$ and $X^4$ may be the same or different. $X^2$ is a group having a functional group that reacts with the active terminal of the active conjugated diene polymer chain. $X^3$ is a group including from 2 to 20 repeating alkylene glycol units, and a portion of the $X_3$ may be a group derived from a group including from 2 to 20 repeating alkylene glycol units. m is an integer from 3 to 200, n is an integer from 0 to 200, and k is an integer from 0 to 200.

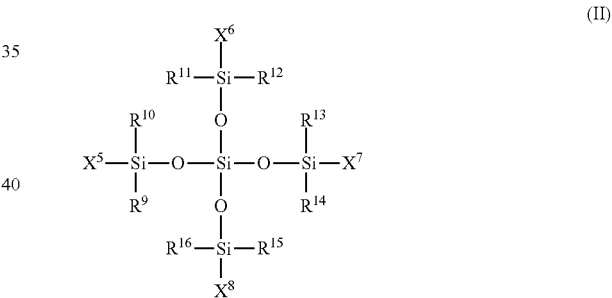

In Formula (II) above, $R^9$ to $R^{16}$ are the same or different alkyl groups having from 1 to 6 carbons or aryl groups having from 6 to 12 carbons. $X^5$ to $X^8$ are groups having a functional group that reacts with the terminal of the conjugated diene polymer chain.

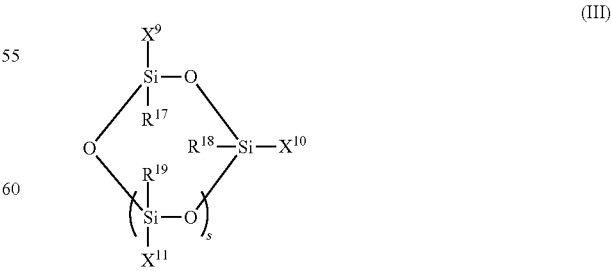

In Formula (III) above, $R^{17}$ to $R^{19}$ are the same or different alkyl groups having from 1 to 6 carbons or aryl groups having from 6 to 12 carbons. $X^9$ to $X^{11}$ are groups having a functional group that reacts with the terminal of the conjugated diene polymer chain. s is an integer of from 1 to 18.

The modified rubber is preferably contained in an amount of from 10 to 100 parts by mass and more preferably from 30 to 100 parts by mass per 100 parts by mass of the diene rubber (A).

In addition, in the present technology, the diene rubber having a hetero atom-containing functional group in a main chain and/or a terminal thereof is preferably a conjugated diene rubber (A') obtained by reacting a polyorganosiloxane represented by General Formula (I) with a conjugated diene polymer chain having an active terminal obtained by forming the following polymer block (C) on the following polymer block (B) in succession with the polymer block (B).

The conjugated diene rubber (A') of the present technology is publicly known and is disclosed in detail along with the production method thereof in International Patent Publication No. WO/2014/050341. The conjugated diene rubber (A') will be described hereinafter. The conjugated diene rubber (A') in the present technology is obtained by reacting a polyorganosiloxane represented by General Formula (I') below with a conjugated diene polymer chain having an active terminal obtained by forming the following polymer block (C) on the following polymer block (B) in succession with the polymer block (B).

Polymer block (B): polymer block with a weight average molecular weight of from 500 to 15,000 having an active terminal containing from 80 to 95 mass % of an isoprene monomer unit and from 5 to 20 mass % of an aromatic vinyl monomer unit.

Polymer block (C): polymer block having an active terminal containing 1,3-butadiene and/or an aromatic vinyl monomer.

[Polymer Block (B)]

The polymer block (B) is not particularly limited as long as the polymer block (B) contains from 80 to 95 mass % of an isoprene monomer unit and from 5 to 20 mass % of an aromatic vinyl monomer unit. The polymer block (B) preferably contains from 85 to 95 mass % of an isoprene monomer unit and from 5 to 15 mass % of an aromatic vinyl monomer unit and more preferably contains from 89 to 95 mass % of an isoprene monomer unit and from 5 to 11 mass % of an aromatic vinyl monomer unit.

Examples of the monomer used to form the aromatic vinyl monomer unit contained in the polymer block (B) include aromatic vinyl monomers such as styrene, α-methylstyrene, 2-methylstyrene, 3-methylstyrene, 4-methylstyrene, 2-ethylstyrene, 3-ethylstyrene, 4-ethylstyrene, 2,4-diisopropyl styrene, 2,4-dimethyl styrene, 4-t-butylstyrene, 5-t-butyl-2-methylstyrene, vinyl naphthalene, dimethylaminomethyl styrene, and dimethylaminoethyl styrene. Among these, styrene is preferred. A single aromatic vinyl monomer may be used alone, or a combination of two or more aromatic vinyl monomers may be used.

The polymer block (B) preferably is composed of only an isoprene monomer unit and an aromatic vinyl monomer unit but may also contain other monomer units in addition to an isoprene monomer unit and an aromatic vinyl monomer unit as desired. Examples of other monomers used to form the other monomer units include conjugated diene monomers other than isoprene such as 1,3-butadiene, 2,3-dimethyl-1,3-butadiene, 2-chloro-1,3-butadiene, 1,3-pentadiene, and 1,3-hexadiene; α- and β-unsaturated nitriles such as acrylonitrile and methacrylonitrile; unsaturated carboxylic acids or acid anhydrides such as acrylic acid, methacrylic acid, and maleic anhydride; unsaturated carboxylic acid esters such as methylmethacrylate, ethylacrylate, and butylacrylate; and non-conjugated dienes such as 1,5-hexadiene, 1,6-heptadiene, 1,7-octadiene, dicyclopentadiene, and 5-ethylidene-2-norbornene. Among these, 1,3-butadiene is preferred. These other monomers may each be used alone, or a combination of two or more types may be used. The content ratio of the other monomer units in the polymer block (B) is not greater than 15 mass %, preferably not greater than 10 mass %, and more preferably not greater than 6 mass %.

The polymer block (B) used in the present technology is obtained by polymerizing a monomer mixture containing isoprene and aromatic vinyl monomers as well as other monomers added as necessary in an inert solvent using a polymerization initiator. The polymer block (B) that is formed has an active terminal.

The inert solvent used in the polymerization of the monomer mixture containing isoprene and aromatic vinyl monomers to form the polymer block (B) is not particularly limited as long as the inert solvent is one that is ordinarily used in solution polymerization and does not hinder the polymerization reaction. Specific examples include chain aliphatic hydrocarbons such as butane, pentane, hexane, heptane, and 2-butene, alicyclic hydrocarbons such as cyclopentane, cyclohexane, and cyclohexene, aromatic hydrocarbons such as benzene, toluene, and xylene. The amount of the inert solvent that is used, in terms of monomer concentration, is from 1 to 80 mass % and preferably from 10 to 50 mass %.

The polymerization initiator used to form the polymer block (B) is not particularly limited as long as the polymerization initiator polymerizes the monomer mixture containing isoprene and aromatic vinyl monomers so as to provide a polymer chain having an active terminal. Specific examples thereof that are preferably used are polymerization initiators containing organic alkali metal compounds, organic alkali earth metal compounds, lanthanide series metal compounds, and the like as main chains.

The amount of the polymerization initiator that is used should be determined according to the targeted molecular weight but is preferably in the range of from 4 to 250 mmol, more preferably from 6 to 200 mmol, and particularly preferably from 10 to 70 mmol per 100 g of the monomer mixture.

The polymerization temperature when the monomer mixture is polymerized, for example, in the range of from −80 to +150° C., preferably from 0 to 100° C., and more preferably from 20 to 90° C. The polymerization mode may be some modes such as batch mode or continuous mode. In addition, various bonding forms such as block-like, tapered, and random bonding forms, for example, may be used as the bonding form.

To adjust the vinyl bond content in the isoprene monomer units of the polymer block (B), a polar compound is preferably added to the inert solvent at the time of polymerization. Examples of the polar compound include ether compounds such as dibutylether, tetrahydrofuran, and 2,2-di (tetrahydrofuryl)propane; tertiary amines such as tetramethylethylenediamine; alkali metal alkoxides; and phosphine compounds. The amount of the polar compound that is used should be determined according to the targeted vinyl bond content but is preferably from 0.01 to 30 mol and more preferably from 0.05 to 10 mol per 1 mol of the polymerization initiator.

The vinyl bond content in the isoprene monomer units of the polymer block (B) is preferably from 5 to 90 mass % and more preferably from 5 to 80 mass %. Note that in this specification, the vinyl bond content in the isoprene monomer unit refers to the proportion of the total amount of isoprene monomer units having a 1,2-structure and isoprene monomer units having a 3,4-structure among the isoprene monomer units.

The weight average molecular weight (Mw) of the polymer block (B) is a value in terms of polystyrene measured by gel permeation chromatography and is preferably from 500 to 15,000, more preferably from 1,000 to 12,000, and particularly preferably from 1,500 to 10,000.

The molecular weight distribution, which is expressed as the ratio (Mw/Mn) of the weight average molecular weight (Mw) to the number average molecular weight (Mn) of the polymer block (B), is preferably from 1.0 to 1.5 and more preferably from 1.0 to 1.3.

[Polymer Block (C)]

The polymer block (C) is not particularly limited as long as the polymer block (C) contains from 50 to 100 mass % of a 1,3-butadiene monomer unit and from 0 to 50 mass % of an aromatic vinyl monomer unit. The polymer block (C) preferably contains from 55 to 95 mass % of a 1,3-butadiene monomer unit and from 5 to 45 mass % of an aromatic vinyl monomer unit and more preferably contains from 55 to 90 mass % of a 1,3-butadiene monomer unit and from 10 to 45 mass % of an aromatic vinyl monomer unit.

The aromatic vinyl monomers listed as examples for the polymer block (B) described above can similarly be used as the monomer used to form the aromatic vinyl monomer unit contained in the polymer block (C), and styrene is preferable.

The polymer block (C) preferably is composed of only a 1,3-butadiene monomer unit or only a 1,3-butadiene monomer unit and an aromatic vinyl monomer unit but may also contain other monomer units in addition to a 1,3-butadiene monomer unit and an aromatic vinyl monomer unit as desired within a range that does not inhibit the essential characteristics of the present technology. With the exception of 1,3-butadiene, the compounds listed as examples for the polymer block (B) described above can similarly be used as other monomers used to form the other monomer units. In addition, in the polymer block (C), isoprene may also be used as another monomer. The content ratio of the other monomer units in the polymer block (C) is not greater than 50 mass %, preferably not greater than 40 mass %, and more preferably not greater than 35 mass %.

The polymer block (C) in the conjugated diene polymer chain used in the present technology is formed in succession with the polymer block (B) by mixing the polymer block (B) having an active terminal and 1,3-butadiene or a monomer mixture containing 1,3-butadiene and an aromatic vinyl monomer and continuing the polymerization reaction. The polymer block (C) that is formed has an active terminal.

The inert solvent used to form the polymer block (C) is the same as the inert solvent used in the preparation of the polymer block (B) described above.

The amount of the polymer block (B) having an active terminal that is used to form the polymer block (C) should be determined according to the targeted molecular weight but is, for example, in the range of from 0.1 to 5 mmol, preferably from 0.15 to 2 mmol, and more preferably from 0.2 to 1.5 mmol per 100 g of 1,3-butadiene or a monomer mixture containing 1,3-butadiene and an aromatic vinyl monomer.

The method of mixing the polymer block (B) and 1,3-butadiene or a monomer mixture containing 1,3-butadiene and an aromatic vinyl monomer is not particularly limited. The polymer block (B) having an active terminal may be added to a solution of 1,3-butadiene or a monomer mixture containing 1,3-butadiene and an aromatic vinyl monomer unit, or 1,3-butadiene or a monomer mixture containing 1,3-butadiene and an aromatic vinyl monomer unit may be added to a solution of the polymer block (B) having an active terminal. From the perspective of controlling polymerization, the polymer block (B) having an active terminal is preferably added to a solution of 1,3-butadiene or a monomer mixture containing 1,3-butadiene and an aromatic vinyl monomer unit.

The polymerization temperature when 1,3-butadiene or a monomer mixture containing 1,3-butadiene and an aromatic vinyl monomer unit is polymerized, is for example, in the range of from −80 to +150° C., preferably from 0 to 100° C., and more preferably from 20 to 90° C. The polymerization mode may be some modes such as batch mode or continuous mode. When the polymer block (C) is used as a copolymer chain, a batch method is preferable in that the bond randomness is easy to control.

Various bonding forms such as block-like, tapered, and random bonding forms, for example, may be used as the bonding form of each monomer when the polymer block (C) is used as a copolymer chain. Among these, random bonding is preferred. By using random bonding, the obtained tire has excellent low heat build-up.

To adjust the vinyl bond content in the 1,3-butadiene monomer unit of the polymer block (C), a polar compound is preferably added to the inert solvent at the time of polymerization in the same manner as at the time of the adjustment of the vinyl bond content in the isoprene monomer unit of the polymer block (B). However, a polar compound does not have to be newly added if a polar compound has been added to the inert solvent in an amount sufficient to adjust the vinyl bond content in the 1,3-butadiene monomer unit of the polymer block (C) at the time of the preparation of the polymer block (B). Specific examples of the polar compound used to adjust the vinyl bond content are the same as the polar compounds used in preparation of the polymer block (B) described above. The used amount of polar compound should be determined according to the targeted vinyl bond content but is preferably from 0.01 to 100 mol, and more preferably from 0.1 to 30 mol per 1 mol of the polymerization initiator. When the amount of the polar compound that is used is within this range, it is easy to adjust the vinyl bond content in the 1,3-butadiene monomer unit, and problems due to deactivation of the polymerization initiator tend not to occur.

The vinyl bond content in the 1,3-butadiene monomer unit of the polymer block (C) is preferably from 10 to 90 mass %, more preferably from 20 to 80 mass %, and particularly preferably from 25 to 70 mass %.

In this way, a conjugated diene polymer chain having an active terminal having a polymer block (B) and a polymer block (C) can be obtained. From the perspective of productivity, the conjugated diene polymer chain having an active terminal used in the present technology is preferably composed of a polymer block (B)/polymer block (C), and the terminal of the polymer block (C) is preferably an active terminal. However, the conjugated diene polymer chain may have a plurality of polymer blocks (B) and may also have other polymer blocks. Examples thereof include conjugated diene polymer chains having active terminals such as blocks composed of only a polymer block (B)/polymer block (C)/polymer block (B) and a polymer block (B)/polymer block (C)/isoprene. When a block composed of only isoprene is formed on the active terminal side of the conjugated diene polymer chain, the amount of isoprene that is used is preferably from 10 to 100 mol, more preferably from 15 to 70 mol, and particularly preferably from 20 to 35 mol per 1 mol of the polymerization initiator used in the first polymerization reaction.

The weight ratio of the polymer block (B) and the polymer block (C) in the conjugated diene polymer chain having an active terminal used in the present technology (when there are a plurality of polymer blocks (B), the weight ratio is based on the total weight of the respective blocks) is preferably from 0.001 to 0.1, more preferably from 0.003 to 0.07, and particularly preferably from 0.005 to 0.05 in terms of (weight of polymer block (B))/(weight of polymer block (C)).

The weight average molecular weight (Mw) of the conjugated diene polymer chain having an active terminal used in the present technology is a value in terms of polystyrene calculated by gel permeation chromatography and is preferably from 100,000 to 1,000,000, more preferably from 150,000 to 700,000, and particularly preferably from 150,000 to 500,000.

The molecular weight distribution, which is expressed as the ratio (Mw/Mn) of the weight average molecular weight (Mw) to the number average molecular weight (Mn) of the conjugated diene polymer chain having an active terminal, is preferably from 1.0 to 5.0, more preferably from 1.0 to 2.5, and particularly preferably from 1.0 to 2.2. When the value of the molecular weight distribution (Mw/Mn) of the conjugated diene polymer chain having an active terminal is within the above range, the conjugated diene rubber is easy to produce.

The content ratio of the total monomer units of the isoprene monomer unit and the 1,3-butadiene monomer unit to the aromatic vinyl monomer unit in the conjugated diene-based polymer chain having an active terminal is preferably such that the conjugated diene polymer chain having an active terminal contains from 50 to 99.995 mass % of total monomer units of the isoprene monomer unit and the 1,3-butadiene monomer unit and from 0.005 to 50 mass % of the aromatic vinyl monomer unit, more preferably from 55 to 95 mass % of total monomer units of the isoprene monomer unit and the 1,3-butadiene monomer unit and from 5 to 45 mass % of the aromatic vinyl monomer unit, and particularly preferably from 55 to 90 mass % of total monomer units of the isoprene monomer unit and the 1,3-butadiene monomer unit and from 10 to 45 mass % of the aromatic vinyl monomer unit. In addition, the vinyl bond content in the isoprene monomer unit and the 1,3-butadiene monomer unit of the conjugated diene polymer chain having an active terminal is the same as the vinyl bond content in the 1,3-butadiene monomer unit of the polymer block (C) described above.

In the production method of the conjugated diene rubber (A') of the present technology, a conjugated diene rubber is obtained by then performing a step of reacting a modifying agent having 3 or more of at least any one group selected from epoxy groups and alkoxy groups in each molecule with the active terminal of the aforementioned conjugated diene polymer chain having an active terminal within a range in which the total molar ratio of epoxy groups and alkoxy groups in the modifying agent with respect to the polymerization initiator used in polymerization is from 0.1 to 1.

[Modifying Agent]

In this specification, a "modifying agent" is a substance having a functional group which reacts with the active terminal of the conjugated diene polymer chain in each molecule. In the present technology, this functional group is at least any one group selected from epoxy groups and alkoxy groups. In the present technology, the number of functional groups is 3 or more in each molecule. By using a modifying agent having 3 or more of at least any one group selected from epoxy groups and alkoxy groups in each molecule, it is possible to modify the conjugated diene polymer chain with high efficiency, so the conjugated diene rubber obtained by the production method of the present technology has enhanced affinity with silica. As a result, the obtained tire has excellent low heat build-up. Note that in this specification, "having 3 or more of at least any one group selected from epoxy groups and alkoxy groups in each molecule" is intended to include cases in which there are 3 or more epoxy groups in each molecule, cases in which there are 3 or more alkoxy groups in each molecule, cases in which there are 1 epoxy group and 2 or more alkoxy groups in each molecule, cases in which there are 2 epoxy groups and 1 or more alkoxy groups in each molecule, and cases in which there are 3 or more epoxy groups and 1 or more alkoxy groups in each molecule.

A polyorganosiloxane represented by General Formula (I') is preferable as the modifying agent used in the present technology.

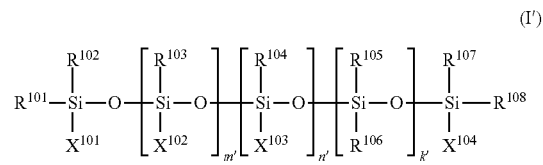

(I')

In General Formula (I') above, $R^{101}$ to $R^{108}$ are the same or different alkyl groups having from 1 to 6 carbons or aryl groups having from 6 to 12 carbons. $X^{101}$ and $X^{104}$ are the same or different groups selected from the group consisting of alkyl groups having from 1 to 6 carbons, aryl groups having from 6 to 12 carbons, alkoxy groups having from 1 to 5 carbons, and epoxy group-containing groups having from 4 to 12 carbons. $X^{102}$ is an alkoxy group having from 1 to 5 carbons or an epoxy group-containing group having from 4 to 12 carbons, and a plurality of $X^{102}$ moieties may be the same as or different from one another. $X^{103}$ is a group containing from 2 to 20 repeating alkylene glycol units, and when there are a plurality of $X^{103}$ moieties, they may be the same as or different from one another. m' is an integer of from 3 to 200; n' is an integer of from 0 to 200; and k' is an integer of from 0 to 200.

Examples of the alkyl groups having from 1 to 6 carbons which may constitute $R^{101}$ to $R^{108}$, $X^{101}$, and $X^{104}$ in the polyorganosiloxanes represented by General Formula (I') include a methyl group, an ethyl group, an n-propyl group, an isopropyl group, a butyl group, a pentyl group, a hexyl group, and a cyclohexyl group. Examples of the aryl groups having from 6 to 12 carbons include a phenyl group, and a methylphenyl group. Among these, a methyl group and an ethyl group are preferred from the perspective of the ease of production of the polyorganosiloxane itself.

Examples of the alkoxy groups having from 1 to 5 carbons which may constitute $X^{101}$, $X^{102}$, and $X^{104}$ in the polyorganosiloxanes represented by General Formula (I') above include a methoxy group, an ethoxy group, a propoxy group, an isopropoxy group, and a butoxy group. Among these, a methoxy group and an ethoxy group are preferred from the perspective of reactivity with the active terminal of the conjugated diene polymer chain.

Examples of the epoxy group-containing groups having from 4 to 12 carbons which may constitute $X^{101}$, $X^{102}$, and $X^{104}$ in the polyorganosiloxanes represented by General Formula (I') above include groups represented by General Formula (II') below.

$$-Z^1-Z^2-E \quad \text{(II')}$$

In General Formula (II'), $Z^1$ is an alkylene group or an alkyl arylene group having from 1 to 10 carbons; $Z^2$ is a methylene group, a sulfur atom, or an oxygen atom; and E is an epoxy group-containing hydrocarbon group having from 2 to 10 carbons.

In the groups represented by General Formula (II'), preferably, $Z^2$ is an oxygen atom; more preferably, $Z^2$ is an oxygen atom and E is a glycidyl group; and particularly preferably, $Z^1$ is an alkylene group having three carbon atoms, $Z^2$ is an oxygen atom, and E is a glycidyl group.

In the polyorganosiloxane represented by General Formula (I'), $X^{101}$ and $X^{104}$ are preferably epoxy group-containing groups having from 4 to 12 carbons or alkyl groups having from 1 to 6 carbons. In addition, of these, $X^{102}$ is preferably an epoxy group-containing group having from 4 to 12 carbons. Furthermore, it is preferable for $X^{101}$ and $X^{104}$ to be alkyl groups having from 1 to 6 carbons and for $X^2$ to be an epoxy group-containing group having from 4 to 12 carbons.

In the polyorganosiloxane represented by General Formula (I'), a group represented by General Formula (III') below—i.e., a group including from 2 to 20 repeating alkylene glycol units—is preferred as $X^{103}$.

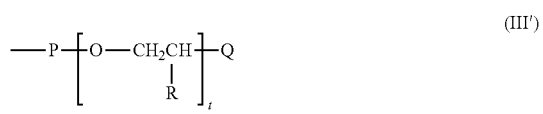

In General Formula (III') above, t is an integer of from 2 to 20; P is an alkyl arylene group or an alkylene group having from 2 to 10 carbons; R is a hydrogen atom or a methyl group; and Q is an aryloxy group or an alkoxy group having from 1 to 10 carbons. Among these, preferably, t is an integer of from 2 to 8, P is an alkylene group having 3 carbons, R is a hydrogen atom, and Q is a methoxy group.

In the polyorganosiloxane represented by General Formula (I'), m' is an integer of from 3 to 200, preferably from 20 to 150, and more preferably from 30 to 120. When m' is 3 or greater, the conjugated diene rubber obtained by the production method of the present technology has enhanced affinity with silica. As a result, the obtained tire has excellent low heat build-up. When m' is 200 or less, the production of the polyorganosiloxane itself is easy, and it is easy to handle without the viscosity being too high.

In addition, in the polyorganosiloxane represented by General Formula (I'), n' is an integer of from 0 to 200, preferably an integer of from 0 to 150, and more preferably an integer of from 0 to 120. k' is an integer of from 0 to 200, preferably an integer of from 0 to 150, and more preferably an integer of from 0 to 130. The total number of m', n', and k' is preferably from 3 to 400, more preferably from 20 to 300, and particularly preferably from 30 to 250. When the total number of m', n', and k' is within the range described above, the production of the polyorganosiloxane itself is easy, and it is easy to handle without the viscosity being too high.

Note that in the polyorganosiloxane represented by General Formula (I'), it is thought that when the epoxy groups in the polyorganosiloxane react with the active terminal of the conjugated diene polymer chain, at least some of the epoxy groups in the polyorganosiloxane are ring-opened so that bonds are formed between the carbon atoms of the portion where the epoxy groups are ring-opened and the active terminal of the conjugated diene polymer chain. In addition, it is thought that when the alkoxy groups in the polyorganosiloxane react with the active terminal of the conjugated diene polymer chain, at least some of the alkoxy groups in the polyorganosiloxane are desorbed so that bonds are formed between the silicon atoms in the polyorganosiloxane to which the desorbed alkoxy groups were bonded and the active terminal of the conjugated diene polymer chain.

The amount of the modifying agent that is used is an amount so that the ratio of the total number of moles of epoxy groups and alkoxy groups in the modifying agent per 1 mol of the polymerization initiator used in polymerization is in the range of from 0.1 to 1, preferably an amount so that the ratio is in the range of from 0.2 to 0.9, and more preferably an amount so that the ratio is in the range of from 0.3 to 0.8. One type of modifying agent may be used alone, or two or more types may be used in combination.

In the production method of the conjugated diene rubber of the present technology, in addition to modifying the conjugated diene polymer chain having an active terminal with the modifying agent described above, the active terminal of part of the conjugated diene polymer chain may be inactivated within a range that does not inhibit the effect of the present technology by adding, for example, a polymerization terminator, a polymerization terminal modifying agent other than the modifying agent described above, and a coupling agent to the polymerization system.

The timing of adding the modifying agent and the like is not particularly limited, but it is desirable to add the modifying agent and the like to a solution in a state in which the polymerization reaction is not complete in the conjugated diene polymer chain having an active terminal, and a solution containing the conjugated diene polymer chain having an active terminal also contains a monomer—more specifically, in a state in which a solution containing the conjugated diene polymer chain having an active terminal contains a monomer in an amount of preferably not less than 100 ppm and more preferably from 300 to 50,000 ppm.

By adding the modifying agent and the like in this way, it is possible to control the reaction well by suppressing side reactions between the conjugated diene polymer chain having an active terminal and impurities contained in the polymerization system.

As the conditions for reacting the modifying agent and the like with the active terminal of the conjugated diene polymer chain, the temperature is, for example, in the range of from 0 to 100° C. and preferably from 30 to 90° C., and the reaction time of each is, for example, in the range of from 1 to 120 minutes and preferably from 2 to 60 minutes.

The conjugated diene rubber (A') obtained in this way contains structures having 3 or more bonds of conjugated diene polymer chains, which are formed by reacting the conjugated diene polymer chain having an active terminal and a modifying agent having 3 or more of at least any one group selected from epoxy groups and alkoxy groups in each molecule, bonded in an amount of preferably from 5 to 40 wt. %, more preferably from 5 to 30 wt. %, and particularly preferably from 10 to 20 wt. %. When the proportion of the structures having 3 or more bonds of conjugated diene polymer chains is within the range described above, the aggregability and drying properties at the time of production are enhanced, and when silica is compounded with the conjugated diene rubber, it is possible to provide a rubber composition having superior processability and a tire having excellent low heat build-up. Note that the ratio of the structures having 3 or more bonds of conjugated diene polymer chains to the total amount of conjugated diene rubber that is ultimately obtained (weight fraction) is expressed as the coupling ratio of 3 or more branches of conjugated diene polymer chains. This coupling ratio may be measured by gel permeation chromatography (in terms of polystyrene). From the chart obtained by gel permeation chromatography measurement, the ratio of the area of the peak portion having a peak top molecular weight 2.8 or more times the peak top molecular weight indicated by the peak of smallest molecular weight to the total elution area is taken as the coupling ratio of three or more branches of the conjugated diene polymer chain.

The weight average molecular weight of the conjugated diene rubber (A') is preferably from 100,000 to 3,000,000, more preferably from 150,000 to 2,000,000, and particularly preferably from 200,000 to 1,500,000 as a value measured by gel permeation chromatography in terms of polystyrene. When the weight average molecular weight of the conjugated diene rubber (A') is within the range described above, it is easy to compound silica into the conjugated diene rubber (A'), which yields excellent processability of the rubber composition and excellent low heat build-up in the obtained tire.

The molecular weight distribution, which is expressed as the ratio (Mw/Mn) of the weight average molecular weight (Mw) to the number average molecular weight (Mn) of the conjugated diene rubber (A'), is preferably from 1.1 to 3.0, more preferably from 1.2 to 2.5, and particularly preferably from 1.2 to 2.2. When the value of the molecular weight distribution (Mw/Mn) of the conjugated diene rubber is within the range described above, the low heat build-up of the obtained tire is superior.

A preferable compounded amount of the conjugated diene rubber (A') is not less than 10 parts by mass when the total amount of the diene rubber is 100 parts by mass, and an even more preferable compounded amount of the conjugated diene rubber (A') is not less than 40 parts by mass when the total amount of the diene rubber is 100 parts by mass.
(B) Silica Examples of the silica used in the present technology include any silica that is conventionally known for its use in rubber compositions, such as a dry silica, wet silica, colloidal silica, and precipitated silica. A single silica can be used alone or a combination of two or more silicas can be used.

Note that in the present technology, from the perspective of further enhancing the effect of the present technology, the nitrogen adsorption specific surface area ($N_2SA$) of silica is preferably from 100 to 400 $m^2/g$ and more preferably from 150 to 300 $m^2/g$. The nitrogen adsorption specific surface area ($N_2SA$) is a value determined in accordance with JIS (Japanese Industrial Standard) K6217-2.
(C) Silane Coupling Agent The silane coupling agent used in the present technology may be a silane coupling agent that can be used in rubber compositions containing silica. Examples thereof include sulfur-containing silane coupling agents, such as bis(3-triethoxysilylpropyl)tetrasulfide, bis(3-triethoxysilylpropyl) disulfide, 3-trimethoxysilylpropyl benzothiazole tetrasulfide, γ-mercaptopropyl triethoxysilane, and 3-octanoylthiopropyl triethoxysilane.
(D) Glycerin Mono-Fatty Acid Ester The glycerin mono-fatty acid ester (D) used in the present technology is a monoglyceride derived from a fatty acid having from 8 to 24 carbons.

Specific examples of fatty acids include straight-chain fatty acids such as caprylic acid, pelargonic acid, capric acid, lauric acid, myristic acid, pentadecylic acid, palmitic acid, margaric acid, stearic acid, oleic acid, arachidic acid, behenic acid, and lignoceric acid.

One type of glycerin mono-fatty acid ester may be used, or two or more types may be used in combination.

From the perspective of enhancing the effect of the present technology, the fatty acid is preferably stearic acid or oleic acid.

According to the research of the present inventors, it is presumed that a glycerin mono-fatty acid ester acts as a lubricant of a diene rubber containing a modified polymer so as to reduce the viscosity of the rubber composition, that two —OH groups derived from glycerin are adsorbed to silanol groups on the silica surface, and that carbon chains derived from the fatty acid act as a hydrophobizing site so as to enhance the silica dispersibility. In addition, the effect of enhancing low fuel consumption without reducing the hardness is also achieved.

In particular, when the alkyl chain of the glycerin mono-fatty acid ester is unsaturated, the unsaturated bond forms a reactive site with sulfur, which makes it possible to relatively reduce the crosslinking density of the polymer and to enhance the breaking strength and breaking elongation by suppressing excessive crosslinking. Rubber composition compounding ratio The rubber composition of the present technology includes:
  (A) 100 parts by mass of a diene rubber:
  (B) from 5 to 200 parts by mass of silica;
  (C) from 1 to 20 mass % of a silane coupling agent relative to the silica; and
  (D) from 1 to 20 mass % of a glycerin mono-fatty acid ester relative to a mass of the silica (B), the glycerin mono-fatty acid ester being derived from a fatty acid having from 8 to 24 carbons.

When the compounded amount of the silica (B) is less than 5 parts by mass, the reinforcing property becomes poor, and when the compounded amount exceeds 200 parts by mass, the processability becomes poor.

When the compounded amount of the silane coupling agent (C) is less than 1 mass % relative to the amount of the silica (B), the effect of the present technology cannot be exhibited because the compounded amount is too small. Conversely, when the compounded amount exceeds 20 mass %, the viscosity becomes poor.

When the compounded amount of the glycerin mono-fatty acid ester (D) is less than 1 mass % relative to the amount of the silica (B), the compounded amount is too small, and the effect of the present technology cannot be achieved. Conversely, when the compounded amount exceeds 20 mass %, the dispersibility of the silica (B), hardness, and low fuel consumption become poor.

The compounded amount of the silica (B) is from 50 to 150 parts by mass per 100 parts by mass of the diene rubber (A).

The compounded amount of the silane coupling agent (C) is more preferably from 2 to 15 mass % relative to the amount of the silica (B).

The compounded amount of the glycerin mono-fatty acid ester (D) is even more preferably from 1 to 10 mass % relative to the amount of the silica (B).

In addition, in the present technology, it is preferable to further compound at least one type of the following copolymers (1) to (3) and the following hydrogenated product (4) with the objective of further enhancing the dispersibility of the silica (B) and hardness.

(1) an α-pinene-aromatic vinyl copolymer;
(2) a β-pinene-aromatic vinyl copolymer;
(3) a copolymer of an aromatic vinyl and at least two types selected from the group consisting of α-pinene, β-pinene, and dipentene;
(4) a hydrogenated product of the copolymers of (1) to (3) above.

Examples of aromatic vinyl constituting the copolymer described above include styrene and α-methylstyrene, and styrene is preferably used.

The compounded amount of the copolymer is preferably from 3 to 30 parts by weight per 100 parts by weight of the diene rubber (A).

Note that in the present technology, a compound represented by General Formula (1) is preferably compounded in order to more effectively balance the suppression of increases in the viscosity of the unvulcanized rubber composition and the dispersibility of the silica and hardness.

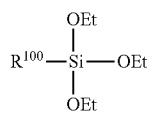
(1)

In General Formula (1), $R^{100}$ is an alkyl group having from 1 to 20 carbons, and Et is an ethyl group.

Here, of the alkyl groups having from 1 to 20 carbons represented by $R^{100}$, alkyl groups having from 7 to 20 carbons are preferable, and specific examples thereof include a heptyl group, an octyl group, a nonyl group, a decyl group, an undecyl group, and a dodecyl group. Among these, from the perspective of miscibility with the diene rubber, an alkyl group having from 8 to 10 carbons is preferable, and an octyl group and a nonyl group are particularly preferable.

The compounded amount of the compound represented by General Formula (1) described above is, for example, from 1 to 10 mass % and preferably from 3 to 8 mass % relative to the amount of silica.

Other Components

The rubber composition of the present technology may include, in addition to the above components, vulcanizing or cross-linking agents; vulcanizing or cross-linking accelerators; fillers such as zinc oxide, carbon black, clay, talc, and calcium carbonate; anti-aging agents; plasticizers; and other various additives commonly included in rubber compositions. The additives are compounded by a common method to obtain a composition that can then be used for vulcanization or cross-linking. Any conventional ordinary amount of these additives may be added to the extent that the object of the present technology is not hindered.

In addition, the rubber composition of the present technology is suitable for producing a pneumatic tire in accordance with a conventional pneumatic tire production method and may be applied to a tread.

EXAMPLES

The present technology will be described in further detail hereinafter using examples and comparative examples, but the present technology is not limited to these examples.

Standard Example 1, Examples 1 and 2, and Comparative Examples 1 to 7 Preparation of Samples According to the composition (parts by mass) shown in Table 1, the components other than the vulcanization accelerator and sulfur were kneaded for 5 minutes in a 1.7-liter sealed Banbury Mixer. The mixture was then discharged to the outside the mixer and cooled at room temperature, and the vulcanization accelerator and sulfur were added and further kneaded with the Banbury mixer to obtain a rubber composition. Thereafter, the obtained rubber composition was pressure-vulcanized in a predetermined mold at 160° C. for 20 minutes to obtain a vulcanized rubber test sample, and then the physical properties of the unvulcanized rubber composition and the vulcanized rubber test sample were measured by the test methods described below.

Mooney viscosity: The viscosity of the unvulcanized rubber at 100° C. was measured in accordance with JIS K 6300. The results are expressed as index values with the value of Standard Example 1 being defined as 100. A smaller value indicates a lower viscosity and thus indicates superior processability.

JIS A hardness: Tests were performed at 20° C. in accordance with JIS K6253. The results are expressed as index values with the value of Standard Example 1 being defined as 100. A larger value indicates higher hardness and superior steering stability.

Payne effect: The value of G' (0.56% strain) was measured at RPA 2000 in accordance with ASTM P6204 using an unvulcanized composition. The results are expressed as index values with the value of Standard Example 1 being defined as 100. A lower value indicates higher silica dispersibility.

tan δ (60° C.): Tests were performed at 60° C. in accordance with JIS K6394. The results are expressed as index values with the value of Standard Example 1 being defined as 100. A smaller value indicates low heat build-up and low fuel consumption.

The results are shown together in Table 1.

TABLE 1

|  | Standard Example 1 | Comparative Example 1 | Example 1 | Comparative Example 2 |
| --- | --- | --- | --- | --- |
| Modified SBR *1 | 100.0 | 100.0 | 100.0 | — |
| Unmodified SBR *2 | — | — | — | 110.0 |
| BR *3 | 20.0 | 20.0 | 20.0 | 20.0 |
| Silica *4 | 90.0 | 90.0 | 90.0 | 90.0 |
| Carbon black *5 | 5.0 | 5.0 | 5.0 | 5.0 |
| Silane coupling agent *6 | 7.2 | 7.2 | 7.2 | 7.2 |
| Zinc oxide *7 | 3.0 | 3.0 | 3.0 | 3.0 |
| Stearic acid *8 | 2.0 | 2.0 | 2.0 | 2.0 |
| Anti-aging agent *9 | 1.5 | 1.5 | 1.5 | 1.5 |
| Process oil *10 | 30.0 | 40.0 | 30.0 | 20.0 |
| Compound 1 *11 | — | — | 6.0 | — |
| Compound 2 *12 | — | — | — | — |
| Compound 3 *13 | — | — | — | — |
| Sulfur *14 | 1.4 | 1.4 | 1.4 | 1.4 |
| Vulcanization accelerator 1 *15 | 1.7 | 1.7 | 1.7 | 1.7 |
| Vulcanization accelerator 2 *16 | 0.4 | 0.4 | 0.4 | 0.4 |
| Measurement results |  |  |  |  |
| Mooney viscosity | 100 | 90 | 90 | 90 |
| JIS A hardness | 100 | 95 | 100 | 100 |
| Payne Effect | 100 | 100 | 90 | 120 |
| tanδ (60° C.) | 100 | 100 | 95 | 110 |

TABLE 1-continued

|  | Comparative Example 3 | Example 2 | Comparative Example 4 |
|---|---|---|---|
| Modified SBR *1 | — | 100.0 | 100.0 |
| Unmodified SBR *2 | 110.0 | — | — |
| BR *3 | 20.0 | 20.0 | 20.0 |
| Silica *4 | 90.0 | 90.0 | 90.0 |
| Carbon black *5 | 5.0 | 5.0 | 5.0 |
| Silane coupling agent *6 | 7.2 | 7.2 | 7.2 |
| Zinc oxide *7 | 3.0 | 3.0 | 3.0 |
| Stearic acid *8 | 2.0 | 2.0 | 2.0 |
| Anti-aging agent *9 | 1.5 | 1.5 | 1.5 |
| Process oil *10 | 20.0 | 30.0 | 30.0 |
| Compound 1 *11 | 6.0 | — | — |
| Compound 2 *12 | — | 6.0 | — |
| Compound 3 *13 | — | — | 6.0 |
| Sulfur *14 | 1.4 | 1.4 | 1.4 |
| Vulcanization accelerator 1 *15 | 1.7 | 1.7 | 1.7 |
| Vulcanization accelerator 2 *16 | 0.4 | 0.4 | 0.4 |
| Measurement results |  |  |  |
| Mooney viscosity | 85 | 90 | 95 |
| JIS A hardness | 100 | 100 | 105 |
| Payne Effect | 110 | 95 | 110 |
| tanδ (60° C.) | 105 | 95 | 105 |

*1: Modified SBR (modified SBR prepared in accordance with the "Modified S-SBR1 production method" described in paragraph 0084 of Japanese Patent No. 5240410 (details given below); oil extender content = 37.5 parts by mass per 100 parts by mass of SBR)
*2: Unmodified SBR (Nipol 1723, manufactured by Zeon Corporation; oil extender content = 37.5 parts by mass per 100 parts by mass of SBR)
*3: BR (Nipol BR1220, manufactured by Zeon Corporation)
*4: Silica (Zeosil 1165MP, manufactured by Rhodia; nitrogen adsorption specific surface area ($N_2$SA) = 165 m²/g)
*5: Carbon black (Show Black N339, manufactured by Cabot Japan, nitrogen adsorption specific surface area ($N_2$SA) = 90 m²/g)
*6 Silane coupling agent (bis(3-triethoxysilylpropyl)tetrasulfide; Si69, manufactured by Evonik-Degussa)
*7: Zinc oxide (Zinc Oxide III, manufactured by Seido Chemical Industry Co., Ltd.)
*8: Stearic acid (Stearic Acid YR, manufactured by NOF Corp.)
*9: Anti-aging agent (Santoflex 6PPD, manufactured by Solutia Europe)
*10: Process oil (Extract No. 4S, manufactured by Showa Shell Sekiyu K. K.)
*11: Compound 1 (glycerol monostearate, manufactured by Sigma-Aldrich Co. LLC.)
*12: Compound 2 (glycerol monooleate, manufactured by Sigma-Aldrich Co. LLC.)
*13: Compound 3 (glycerin, manufactured by Sigma-Aldrich Co. LLC.)
*14: Sulfur (oil-treated sulfur, manufactured by Karuizawa Refinery Ltd.)
*15: Vulcanization accelerator 1 (NOCCELER CZ-G made by Ouchi Shinko Chemical Industrial Co., Ltd.)
*16: Vulcanization accelerator 2 (Perkacit DPG, manufactured by Flexsys Chemicals)

Modified SBR Production Method

First, 4533 g of cyclohexane, 338.9 g (3.254 mol) of styrene, 468.0 g (8.652 mol) of butadiene, 20.0 g (0.294 mol) of isoprene, and 0.189 mL (1.271 mmol) of N,N,N', N'-tetramethylethylenediamine were introduced into a nitrogen-purged autoclave reaction vessel having an internal capacity of 10 L. Then, agitation was begun. After the temperature of the content in the reaction vessel was adjusted to 50° C., 5.061 mL (7.945 mmol) of n-butyllithium was added. After the rate of polymerization conversion reached approximately 100%, 12.0 g more of isoprene was added and the mixture was reacted for 5 minutes. Then, 0.281 g (0.318 mmol) of a toluene solution containing 40 wt. % of 1,6-bis(trichlorosilyl)hexane was added and the mixture was reacted for 30 minutes. Furthermore, 18.3 g (0.318 mmol) of a xylene solution containing 40 wt. % of polyorganosiloxane A described below was added and the mixture was reacted for 30 minutes. Then, 0.5 mL of methanol was added and the mixture was agitated for 30 minutes. A small amount of anti-aging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using a roll and dried in a dryer. Thus, the modified SBR was obtained.

Polyorganosiloxane A: Polyorganosiloxane having the structure of General Formula (I), where m=80, n=0, k=120, $X^1$, $X^4$, $R^1$ to $R^3$, and $R^5$ to $R^8$ are each methyl groups (—$CH_3$), and $X^2$ is a group represented by Formula (VIII).

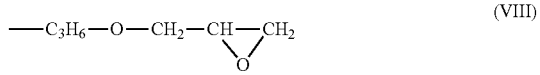

(VIII)

As is clear from the results of Table 1 above, it can be seen that because the rubber compositions obtained in Examples 1 and 2 are obtained by compounding specific amounts of (B) silica, (C) a silane coupling agent, and a specific (D) glycerin mono-fatty acid ester with (A) a diene rubber having a specific composition, these rubber compositions have high dispersibility of the silica (B) and excellent processability and low fuel consumption in comparison to the rubber composition of Standard Example 1.

Comparative Example 1 is an example in which a process oil was compounded in a higher amount in the rubber composition described in Standard Example 1, and the hardness decreased.

Comparative Example 2 is an example in which a modified rubber was not compounded but an unmodified SBR was compounded. The dispersibility of the silica (B) decreased, and the low fuel consumption was also diminished.

Comparative Example 3 is an example in which a specific glycerin mono-fatty acid ester (D) was compounded with the rubber composition of Comparative Example 2. Although the viscosity decreased, the dispersibility of the silica (B) decreased, and the low fuel consumption was also diminished.

Comparative Example 4 is an example in which a specific glycerin mono-fatty acid ester (D) was not compounded, and glycerin was compounded instead. Therefore, the dispersibility of the silica (B) decreased, and the low fuel consumption was also diminished.

Examples 3 to 8 and Comparative Examples 5 to 8

The examples described above were repeated with the exception that the compounded amount of the glycerin mono-fatty acid ester (D) relative to the silica (B) was variously altered. The results are shown in Table 2. Note that the results of Standard Example 1 described above are also shown in Table 2.

Examples 9 and 10 and Comparative Example 10

The effects of the compounding of the glycerin mono-fatty acid ester (D) were investigated in systems containing resins. The above examples were otherwise repeated as described above. The results are shown together in Table 2.

TABLE 2

|  | Standard Example 1 | Comparative Example 5 | Example 3 | Example 4 | Example 5 |
|---|---|---|---|---|---|
| Modified SBR *1 | 100.0 | 100.0 | 100.0 | 100.0 | 100.0 |
| BR *3 | 20.0 | 20.0 | 20.0 | 20.0 | 20.0 |
| Silica *4 | 90.0 | 90.0 | 90.0 | 90.0 | 90.0 |

TABLE 2-continued

| | | | | | |
|---|---|---|---|---|---|
| Carbon black *5 | 5.0 | 5.0 | 5.0 | 5.0 | 5.0 |
| Silane coupling agent *6 | 7.2 | 7.2 | 7.2 | 7.2 | 7.2 |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 30.0 | 30.0 | 30.0 | 30.0 | 30.0 |
| Compound 1 *11 | — | 0.1 | 1.0 | 6.0 | 10.0 |
| Ratio of compound 1 to silica (mass %) | — | 0.1 | 1.1 | 6.7 | 11.1 |
| Compound 2 *12 | — | — | — | — | — |
| Ratio of compound 2 to silica (mass %) | — | — | — | — | — |
| Resin *17 | — | — | — | — | — |
| Sulfur *14 | 1.4 | 1.4 | 1.4 | 1.4 | 1.4 |
| Vulcanization accelerator 1 *15 | 1.7 | 1.7 | 1.7 | 1.7 | 1.7 |
| Vulcanization accelerator 2 *16 | 0.4 | 0.4 | 0.4 | 0.4 | 0.4 |
| Measurement results | | | | | |
| Mooney viscosity | 100 | 100 | 95 | 90 | 85 |
| JIS A hardness | 100 | 100 | 100 | 100 | 100 |
| Payne Effect | 100 | 100 | 95 | 90 | 85 |
| tanδ (60° C.) | 100 | 100 | 95 | 95 | 90 |

| | Comparative Example 6 | Comparative Example 7 | Example 6 | Example 7 | Example 8 |
|---|---|---|---|---|---|
| Modified SBR *1 | 100.0 | 100.0 | 100.0 | 100.0 | 100.0 |
| BR *3 | 20.0 | 20.0 | 20.0 | 20.0 | 20.0 |
| Silica *4 | 90.0 | 90.0 | 90.0 | 90.0 | 90.0 |
| Carbon black *5 | 5.0 | 5.0 | 5.0 | 5.0 | 5.0 |
| Silane coupling agent *6 | 7.2 | 7.2 | 7.2 | 7.2 | 7.2 |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 30.0 | 30.0 | 30.0 | 30.0 | 30.0 |
| Compound 1 *11 | 30.0 | — | — | — | — |
| Ratio of compound 1 to silica (mass %) | 33.3 | — | — | — | — |
| Compound 2 *12 | — | 0.1 | 1.0 | 6.0 | 10.0 |
| Ratio of compound 2 to silica (mass %) | — | 0.1 | 1.1 | 6.7 | 11.1 |
| Resin *17 | — | — | — | — | — |
| Sulfur *14 | 1.4 | 1.4 | 1.4 | 1.4 | 1.4 |
| Vulcanization accelerator 1 *15 | 1.7 | 1.7 | 1.7 | 1.7 | 1.7 |
| Vulcanization accelerator 2 *16 | 0.4 | 0.4 | 0.4 | 0.4 | 0.4 |
| Measurement results | | | | | |
| Mooney viscosity | 65 | 100 | 90 | 85 | 75 |
| JIS A hardness | 95 | 100 | 105 | 105 | 105 |
| Payne Effect | 105 | 100 | 90 | 80 | 80 |
| tanδ (60° C.) | 105 | 100 | 90 | 90 | 85 |

| | Comparative Example 8 | Comparative Example 9 | Example 9 | Example 10 |
|---|---|---|---|---|
| Modified SBR *1 | 100.0 | 100.0 | 100.0 | 100.0 |
| BR *3 | 20.0 | 20.0 | 20.0 | 20.0 |
| Silica *4 | 90.0 | 90.0 | 90.0 | 90.0 |
| Carbon black *5 | 5.0 | 5.0 | 5.0 | 5.0 |
| Silane coupling agent *6 | 7.2 | 7.2 | 7.2 | 7.2 |
| Zinc oxide *7 | 3.0 | 3.0 | 3.0 | 3.0 |
| Stearic acid *8 | 2.0 | 2.0 | 2.0 | 2.0 |
| Anti-aging agent *9 | 1.5 | 1.5 | 1.5 | 1.5 |
| Process oil *10 | 30.0 | 30.0 | 30.0 | 30.0 |
| Compound 1 *11 | — | — | 6.0 | — |
| Ratio of compound 1 to silica (mass %) | — | — | 6.7 | — |
| Compound 2 *12 | 30.0 | — | — | 6.0 |
| Ratio of compound 2 to silica (mass %) | 33.3 | — | — | 6.7 |
| Resin *17 | — | 10.0 | 10.0 | 10.0 |
| Sulfur *14 | 1.4 | 1.4 | 1.4 | 1.4 |
| Vulcanization accelerator 1 *15 | 1.7 | 1.7 | 1.7 | 1.7 |
| Vulcanization accelerator 2 *16 | 0.4 | 0.4 | 0.4 | 0.4 |
| Measurement results | | | | |
| Mooney viscosity | 65 | 110 | 100 | 85 |
| JIS A hardness | 95 | 105 | 105 | 110 |
| Payne Effect | 100 | 100 | 95 | 90 |
| tanδ (60° C.) | 100 | 105 | 100 | 95 |

*17: Resin (terpene styrene resin TO-125, manufactured by Yasuhara Chemical Co., Ltd.)

From the results of Table 2, an effect of enhancing physical properties was not confirmed in Comparative Examples 5 and 7 because the compounded amounts of the glycerin mono-fatty acid ester (D) were less than the lower limits prescribed by the present technology.

In contrast, in Examples 3 and 6, the compounded amounts of the glycerin mono-fatty acid ester (D) were within the range prescribed by the present technology, so the dispersibility of the silica (B), the processability, and the low fuel consumption were enhanced without any reduction in hardness. Examples 4, 5, 7, and 8 are examples in which the compounded amounts of the glycerin mono-fatty acid ester (D) were increased, and each of the physical properties was further enhanced.

In Comparative Examples 6 and 8, the compounded amounts of the glycerin mono-fatty acid ester (D) exceeded the upper limit prescribed by the present technology, so the dispersibility of the silica (B), hardness, and the low fuel consumption were diminished.

Comparative Example 9 is an example in which a glycerin mono-fatty acid ester (D) was not compounded but a resin was compounded. However, the processability and low fuel consumption were diminished.

In contrast, in Examples 9 and 10, the glycerin mono-fatty acid ester (D) was compounded within the range prescribed by the present technology, so the dispersibility of the silica (B), the processability, and the low fuel consumption were enhanced without any reduction in hardness in comparison to the results of Comparative Example 9.

Standard Example 2, Examples 11 to 17, and Comparative Examples 10 to 15 Preparation of Samples According to the composition (part by mass) shown in Table 3, the components other than the vulcanization accelerator and sulfur were kneaded for 5 minutes in a 1.7-liter sealed Banbury Mixer. The vulcanization accelerator and sulfur were then added to the mixture and further kneaded to obtain a rubber composition. Thereafter, the obtained rubber composition was pressure-vulcanized in a predetermined mold at 160° C. for 20 minutes to obtain a vulcanized rubber test sample, and then the physical properties of the vulcanized rubber test sample were measured by the test methods described below.

Mooney viscosity: The viscosity of the unvulcanized rubber at 100° C. was measured in accordance with JIS K 6300. The results are expressed as index values with the value of Standard Example 1 being defined as 100. A smaller value indicates a lower viscosity and thus indicates superior processability.

Payne effect: The value of G' (0.56% strain) was measured at RPA 2000 in accordance with ASTM P6204 using an unvulcanized composition. The results are expressed as index values with the value of Standard Example 1 being defined as 100. A lower value indicates higher silica dispersibility.

Hardness: Tests were performed at 20° C. in accordance with JIS K6253. The results are expressed as index values with the value of Standard Example 1 being defined as 100. A higher value indicates higher hardness.

The results are shown in Table 3.

[TABLE 3-1]

|  | Standard Example 2 | Comparative Example 10 | Comparative Example 11 | Example 11 | Example 12 |
|---|---|---|---|---|---|
| Unmodified SBR *18 | 80.0 | — | — | — | — |
| Conjugated Diene Rubber (A) *19 | — | 80.0 | 80.0 | 80.0 | 80.0 |
| BR *20 | 20.0 | 20.0 | 20.0 | 20.0 | 20.0 |
| Silica *21 | 70.0 | 70.0 | 70.0 | 70.0 | 70.0 |
| Carbon black *22 | 5.0 | 5.0 | 5.0 | 5.0 | 5.0 |
| Silane coupling agent *23 | 5.6 | 5.6 | 5.6 | 5.6 | 5.6 |
| Alkyltriethoxysilane *24 | — | — | — | — | — |
| Glycerin mono-fatty acid ester 1 *25 | — | — | 0.1 | 4.0 | 10.0 |
| Glycerin mono-fatty acid ester 2 *25' | — | — | — | — | — |
| Glycerin mono-fatty acid ester 3 *25'' | — | — | — | — | — |
| Glycerin mono-fatty acid ester 4 *25''' | — | — | — | — | — |
| Glycerin mono-fatty acid ester 5 *25'''' | — | — | — | — | — |
| Glycerin *26 | — | — | — | — | — |
| Zinc oxide *27 | 3.0 | 3.0 | 3.0 | 3.0 | 3.0 |
| Stearic acid *28 | 2.0 | 2.0 | 2.0 | 2.0 | 2.0 |
| Anti-aging agent *29 | 1.5 | 1.5 | 1.5 | 1.5 | 1.5 |
| Process oil *30 | 20.0 | 20.0 | 20.0 | 20.0 | 20.0 |
| Sulfur *31 | 2.0 | 2.0 | 2.0 | 2.0 | 2.0 |
| Vulcanization accelerator CZ *32 | 1.7 | 1.7 | 1.7 | 1.7 | 1.7 |
| Vulcanization accelerator DPG *33 | 0.4 | 0.4 | 0.4 | 0.4 | 0.4 |
| Measurement results |  |  |  |  |  |
| Mooney viscosity | 100 | 105 | 105 | 80 | 65 |
| Payne Effect | 100 | 90 | 90 | 80 | 60 |
| Hardness (20° C.) | 100 | 95 | 95 | 105 | 105 |

[TABLE 3-2]

|  | Comparative Example 12 | Comparative Example 13 | Comparative Example 14 | Example 13 |
|---|---|---|---|---|
| Unmodified SBR *18 | — | — | 75.0 | 40.0 |
| Conjugated Diene Rubber (A) *19 | 80.0 | 80.0 | 5.0 | 40.0 |
| BR *20 | 20.0 | 20.0 | 20.0 | 20.0 |
| Silica *21 | 70.0 | 70.0 | 70.0 | 70.0 |
| Carbon black *22 | 5.0 | 5.0 | 5.0 | 5.0 |

-continued

| | | | | |
|---|---|---|---|---|
| Silane coupling agent *23 | 5.6 | 5.6 | 5.6 | 5.6 |
| Alkyltriethoxysilane *24 | — | — | — | — |
| Glycerin mono-fatty acid ester 1 *25 | 30.0 | — | — | 4.0 |
| Glycerin mono-fatty acid ester 2 *25' | — | — | — | — |
| Glycerin mono-fatty acid ester 3 *25" | — | — | — | — |
| Glycerin mono-fatty acid ester 4 *25''' | — | — | — | — |
| Glycerin mono-fatty acid ester 5 *25'''' | — | — | — | — |
| Glycerin *26 | — | 4.0 | — | — |
| Zinc oxide *27 | 3.0 | 3.0 | 3.0 | 3.0 |
| Stearic acid *28 | 2.0 | 2.0 | 2.0 | 2.0 |
| Anti-aging agent *29 | 1.5 | 1.5 | 1.5 | 1.5 |
| Process oil *30 | 20.0 | 20.0 | 20.0 | 20.0 |
| Sulfur *31 | 2.0 | 2.0 | 2.0 | 2.0 |
| Vulcanization accelerator CZ *32 | 1.7 | 1.7 | 1.7 | 1.7 |
| Vulcanization accelerator DPG *33 | 0.4 | 0.4 | 0.4 | 0.4 |
| Measurement results | | | | |
| Mooney viscosity | 50 | 105 | 100 | 90 |
| Payne Effect | 55 | 110 | 105 | 95 |
| Hardness (20° C.) | 95 | 100 | 100 | 100 |

[TABLE 3-3]

| | Example 14 | Comparative Example 15 | Example 15 | Example 16 | Example 17 |
|---|---|---|---|---|---|
| Unmodified SBR *18 | — | — | — | — | — |
| Conjugated Diene Rubber (A) *19 | 80.0 | 80.0 | 80.0 | 80.0 | 80.0 |
| BR *20 | 20.0 | 20.0 | 20.0 | 20.0 | 20.0 |
| Silica *21 | 70.0 | 70.0 | 70.0 | 70.0 | 70.0 |
| Carbon black *22 | 5.0 | 5.0 | 5.0 | 5.0 | 5.0 |
| Silane coupling agent *23 | 5.6 | 5.6 | 5.6 | 5.6 | 5.6 |
| Alkyltriethoxysilane *24 | 3.0 | — | — | — | — |
| Glycerin mono-fatty acid ester 1 *25 | 4.0 | — | — | — | — |
| Glycerin mono-fatty acid ester 2 *25' | — | 4 | — | — | — |
| Glycerin mono-fatty acid ester 3 *25" | — | — | 4 | — | — |
| Glycerin mono-fatty acid ester 4 *25''' | — | — | — | 4 | — |
| Glycerin mono-fatty acid ester 5 *25'''' | — | — | — | — | 4 |
| Glycerin *26 | — | — | — | — | — |
| Zinc oxide *27 | 3.0 | 3.0 | 3.0 | 3.0 | 3.0 |
| Stearic acid *28 | 2.0 | 2.0 | 2.0 | 2.0 | 2.0 |
| Anti-aging agent *29 | 1.5 | 1.5 | 1.5 | 1.5 | 1.5 |
| Process oil *30 | 20.0 | 20.0 | 20.0 | 20.0 | 20.0 |
| Sulfur *31 | 2.0 | 2.0 | 2.0 | 2.0 | 2.0 |
| Vulcanization accelerator CZ *32 | 1.7 | 1.7 | 1.7 | 1.7 | 1.7 |
| Vulcanization accelerator DPG *33 | 0.4 | 0.4 | 0.4 | 0.4 | 0.4 |
| Measurement results | | | | | |
| Mooney viscosity | 60 | 105 | 95 | 85 | 80 |
| Payne Effect | 70 | 105 | 95 | 95 | 80 |
| Hardness (20° C.) | 105 | 100 | 100 | 105 | 110 |

*18: Unmodified SBR (Nipol 1723, manufactured by Zeon Corporation; oil extender content = 37.5 parts by mass per 100 parts by mass of SBR) (the actual amount of rubber is shown in Table 1))
*19: Conjugated diene rubber (A') (conjugated diene rubber produced in accordance with Example 1 of WO/2014/050341) Oil extended product (the actual amount of rubber is shown in Table 1); having the following properties: Structure of polymer block (B) having an active terminal = hydrocarbyl lithium compound of random blocks of styrene and isoprene
Isoprene content in polymer block (B) = 92.8 mass %
Styrene content in polymer block (B) = 7.2 mass %
Weight average molecular weight of polymer block (B) = 8,400
Monomer of polymer block (C) = mixture of 1,3-butadiene and styrene
Modifying agent = polyorganosiloxane represented by Formula (IV) below (an amount equivalent to 0.33 times the molar amount of the polymerization initiator that was used was reacted)
Styrene content of conjugated diene rubber (A) = 21.6 mass %
Vinyl content of conjugated diene rubber (A) = 53.6 mass %
Weight average molecular weight of conjugated diene rubber (A) = 375,000

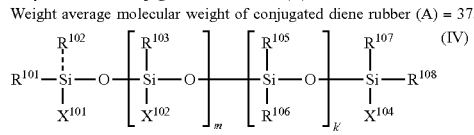

$m' = 80, k' = 120$

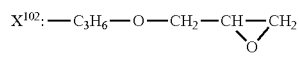

$X^{101}, X^{104}, R^{101} \sim R^{103}, R^{105} \sim R^{108}$: —CH$_3$

*20: BR (Nipol BR1220, manufactured by Zeon Corporation)
*21: Silica (Zeosil 1165MP, manufactured by Rhodia; nitrogen adsorption specific surface area (N$_2$SA) = 165 m$^2$/g)
*22: Carbon black (Show Black N339 manufactured by Cabot Japan, nitrogen adsorption specific surface area (N$_2$SA) = 90 m$^2$/g)
*23: Silane coupling agent (bis(3-triethoxysilylpropyl)tetrasulfide; Si69, manufactured by Evonik-Degussa)
*24: Alkyltriethoxysilane (KBE-3083, manufactured by Shin-Etsu Chemical Co., Ltd., n-octyltriethoxysilane)

*25: Glycerin mono-fatty acid ester 1 (glycerol monostearate, manufactured by Sigma-Aldrich Co. LLC.)
*25': Glycerin mono-fatty acid ester 2 (glycerol monobutyrate)
*25": Glycerin mono-fatty acid ester 3 (glycerol monodecanoate)
*25''': Glycerin mono-fatty acid ester 4 (glycerol monobehenate)
*25'''': Glycerin mono-fatty acid ester 5 (glycerol monooleate)
*26: Glycerin (manufactured by Sigma-Aldrich Co. LLC.)
*27: Zinc oxide (Zinc Oxide III, manufactured by Seido Chemical Industry Co., Ltd.)
*28: Stearic acid (Stearic Acid YR, manufactured by NOF Corp.)
*29: Anti-aging agent (Santoflex 6PPD, manufactured by Solutia Europe)
*30: Process oil (Extract No. 4S, manufactured by Showa Shell Sekiyu K.K.)
*31: Sulfur (oil-treated sulfur, manufactured by Karuizawa Refinery Ltd.)
*32: Vulcanization accelerator CZ (NOCCELER CZ-G, manufactured by Ouchi Shinko Chemical Industrial Co., Ltd.)
*33: Vulcanization accelerator DPG (Perkacit DPG, manufactured by Flexsys Chemicals)

As is clear from the results of Table 3, it can be seen that because the rubber compositions obtained in Examples 11 to 17 are obtained by compounding specific amounts of a glycerin mono-fatty acid ester with a rubber composition obtained by compounding a specific modified rubber and a silica, these rubber compositions have a reduced Mooney viscosity, high silica dispersibility, and enhanced hardness in comparison to Standard Example 2, which is a representative conventional example.

In contrast, a glycerin mono-fatty acid ester was not compounded in Comparative Example 10, so the Mooney viscosity increased and the hardness also decreased.

In Comparative Example 11, the compounded amount of the glycerin mono-fatty acid ester was less than the lower limit prescribed by the present technology, so the Mooney viscosity increased and the hardness also decreased.

In Comparative Example 12, the compounded amount of the glycerin mono-fatty acid ester exceeded the upper limit prescribed by the present technology, so the hardness decreased.

Comparative Example 13 is an example in which glycerin was compounded instead of a glycerin mono-fatty acid ester, so the Mooney viscosity increased and the silica dispersibility was diminished.

In Comparative Example 14, the compounded amount of the conjugated diene rubber (A') was less than the lower limit prescribed by the present technology, so the silica dispersibility was diminished.

Comparative Example 15 is an example in which glycerol monobutyrate was compounded, so the Mooney viscosity increased and the silica dispersibility was diminished.

The invention claimed is:

1. A rubber composition comprising:
   (A) 100 parts by mass of a diene rubber, not less than 10 parts by mass out of 100 parts by mass of the diene rubber (A) having a hetero atom-containing functional group in a main chain and/or a terminal thereof;
   (B) from 5 to 200 parts by mass of silica;
   (C) from 1 to 20 mass % of a silane coupling agent relative to the silica;
   (D) from 1 to 20 mass % of a glycerin mono-fatty acid ester relative to a mass of the silica (B), the glycerin mono-fatty acid ester being derived from a fatty acid having from 8 to 24 carbons; and
   at least one type of copolymers (1) to (3) and a hydrogenated product (4), wherein:
   the copolymer (1) is an α-pinene-aromatic vinyl copolymer;
   the copolymer (2) is a β-pinene-aromatic vinyl copolymer;
   the copolymer (3) is a copolymer of an aromatic vinyl and at least two types selected from the group consisting of α-pinene, β-pinene, and dipentene; and
   the hydrogenated product (4) is a hydrogenated product of the copolymers (1) to (3).

2. The rubber composition according to claim 1, wherein the diene rubber having the hetero atom-containing functional group in the main chain and/or the terminal thereof is a conjugated diene rubber (A') obtained by reacting a polyorganosiloxane represented by General Formula (I') with a conjugated diene polymer chain having an active terminal obtained by forming a polymer block (C) on a polymer block (B) in succession with the polymer block (B), wherein:

the polymer block (B) is a polymer block with a weight average molecular weight of from 500 to 15,000 having an active terminal containing from 80 to 95 mass % of an isoprene monomer unit and from 5 to 20 mass % of an aromatic vinyl monomer unit; and the polymer block (C) is a polymer block having an active terminal containing 1,3-butadiene and/or an aromatic vinyl monomer unit,

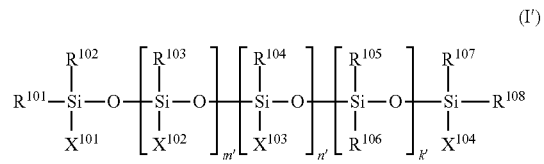

(I')

where, $R^{101}$ to $R^{108}$ are the same or different alkyl groups having from 1 to 6 carbons or aryl groups having from 6 to 12 carbons, $X^{101}$ and $X^{104}$ are the same or different groups selected from the group consisting of alkyl groups having from 1 to 6 carbons, aryl groups having from 6 to 12 carbons, alkoxy groups having from 1 to 5 carbons, and epoxy group-containing groups having from 4 to 12 carbons, $X^{102}$ is an alkoxy group having from 1 to 5 carbons or an epoxy group-containing group having from 4 to 12 carbons, and a plurality of $X^{102}$ moieties may be the same as or different from one another, $X^{103}$ is a group containing from 2 to 20 repeating alkylene glycol units, and when there are a plurality of $X^{103}$ moieties, they may be the same as or different from one another, m' is an integer of from 3 to 200, n' is an integer of from 0 to 200, and k' is an integer of from 0 to 200.

3. The rubber composition according to claim 1, wherein from 1 to 10 mass % of a compound represented by General Formula (1) is further compounded with the silica:

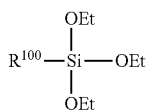

(1)

where, $R^{100}$ is an alkyl group having from 1 to 20 carbons, and Et is an ethyl group.

4. The rubber composition according to claim 1, wherein the glycerin mono-fatty acid ester (D) contains an unsaturated bond.

5. A pneumatic tire comprising a tread including the rubber composition according to claim 1.

6. The rubber composition according to claim 2, wherein from 1 to 10 mass % of a compound represented by General Formula (1) is further compounded with the silica:

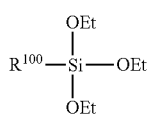

(1)

where, $R^{100}$ is an alkyl group having from 1 to 20 carbons, and Et is an ethyl group.

7. The rubber composition according to claim 6, wherein the glycerin mono-fatty acid ester (D) contains an unsaturated bond.

8. A pneumatic tire comprising a tread including the rubber composition according to claim 7.

* * * * *